Aug. 29, 1944.    J. G. JACKSON    2,357,048
BAKING PAN REINFORCEMENT
Filed July 5, 1941

INVENTOR.
Joseph G. Jackson
BY Stanley Hoods
ATTORNEY.

Patented Aug. 29, 1944

2,357,048

UNITED STATES PATENT OFFICE 2,357,048

BAKING PAN REINFORCEMENT

Joseph G. Jackson, Chicago, Ill., assignor to Ekco Products Company, a corporation of Illinois Application July 5, 1941, Serial No. 401,115

8 Claims. (Cl. 220—71)

This invention, while particularly adapted to the manufacture and fabrication of reinforced baking pan sets wherein the individual pans are relatively deep and of the folded type, it relates to baking pan constructions in general, having for its object the securing of reinforcing straps to the walls of the pans of the set and at the same time securing the pans in rigid unitary relation.

With the above and other objects in view, as will be apparent, this invention consists in the construction, combination and arrangement of parts, all as hereinafter described, claimed and illustrated in the accompanying drawing, wherein:

Figure 1:
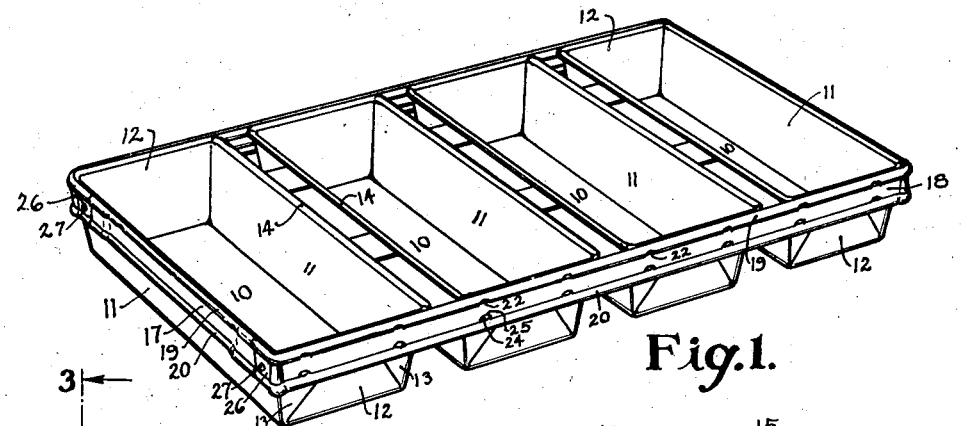
Fig. 1 is a top perspective view of a baking pan set illustrating one mode of attachment of reinforcing straps to the outer pan walls as contemplated by this invention.

While Fig. 1 shows a multiple baking pan set consisting of four pans secured together within a strapping frame, for the purpose of illustrating a typical embodiment of the present invention, it will be apparent that when desired a fewer or greater number of pans may be included in a set by increasing or decreasing the lengths of the sides of the strapping frame and that multiple pans of various sizes may be accommodated by varying the sizes and materials of the strapping frame. A single baking pan, wherein it may be desired to reinforce one or more of its walls, may also be equipped with a reinforcing member embodying the features of connection contemplated by this invention.

Referring more particularly to the drawing, each of the pans shown is of the folded type having a bottom 10, side walls 11 and end walls 12 with corner folds 13 formed of excess metal at the corners of the pan during fabrication thereof, said folds being bent at right angles to the side walls 11 to rest flush against the outer surfaces of the end walls 12. Encircling the walls 11 and 12 and crimped within a flange 14 formed at the upper edges of said walls 11 and 12 is a wire 15. The crimping of the wire 15 within the flange 14 creates an outstanding reinforcing bead.

The pan assembly shown in the drawing contemplates the use of a reinforcing member or strap 18 positioned against the aligned end walls 12 of the pans of the set. The upper edge of this strap is provided with a marginal channel 19, formed integrally with the strap, which develops a bead having its mid-portion offset outwardly from the general plane of the strap 18. A similar bead 20 is preferably provided at the lower edge of the strap 18. As clearly shown in Fig. 3, the pan bead 14 is adapted to be seated within and embraced by the channel 19, while the portion of the strap therebelow rests against and partially covers the corner laps 13 lying against the end wall 12 of the pan shown. In order to secure the strap 18 in place as above described, a pair of inwardly and upwardly projecting tongues 22 pierced from the portion of the channel 19 in underlying relation to the bead and below the mid-region of said channel, are engaged behind the pan bead 14, at points spaced slightly inwardly of the limits of each upper corner of the end wall 12. The interengagement thus provided between the pan bead 14 and the channel 19 is effective to prohibit movement of the strap 18 vertically of the end wall 12 and since the tongues 22 coact with the channel 19 to embrace the pan bead through an arc in excess of 180 degrees, the strap 18 is also locked against lateral movement relative to the pan bead 14.

The material of the strap 18 is also preferably offset outwardly as at 23 to provide a central panel in a plane somewhat outward of the base or root of the tongue 22. Thus the mid-region of the bead formed by the channel 19 and the central panel 23 in the strap 18 coact to so confine the edges of the opening in the strap resulting from the formation of tongue 22 as to minimize, if not entirely eliminate the hazard of the raw edges hindering handling of the pans, such as becoming snagged on a neighboring pan when moved in proximity to such pan.

The strap 18 is further anchored or fastened to the pan at its lower portion by means of inwardly projecting tongues 24 pierced from the material of the strap at a point above the mid-region of the bead formed by the channel 20 and near the lower limits of the central panel 23. The tongues 24 are adapted to enter slots 25 cut in both layers of the corner folds 13 at points substantially vertically aligned with the fastening of the tongues 22 behind the pan bead 14. The tongues 24 so passed through the slots 25 in the corner folds may be directed either upwardly or downwardly so as to lie between the innermost layer of the associated corner fold and the outer surface of the adjacent pan wall 12.

An extension 26 is provided at the ends of the strap 18 which, when bent at substantially right angles to the body of the strap, is adapted to rest against the outer surface of a strap 17 arranged against the exposed side walls 11 of the outermost pans of the set. The overlapped portions of said straps 17 and 18 are preferably connected by means of rivets 27 or the like passed through said overlapped portions but free of the pan wall 11. As shown in the drawing the upper edge of the straps 17 are also preferably provided with a channel 19 forming a continuation of the channel 19 on the straps 18, and integral tongues 22 corresponding to the tongues 22 of the strap 18 for engagement with the pan bead 14 at the top edges of the side walls 11.

Figure 2:
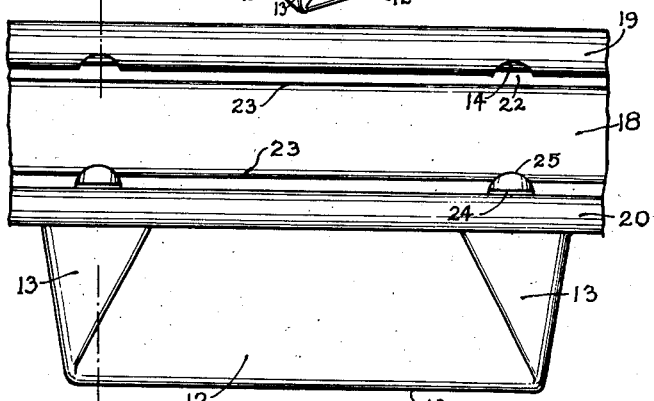
Fig. 2 is an enlarged end elevational view of an individual pan forming part of the set shown in Fig. 1.
Figure 3:
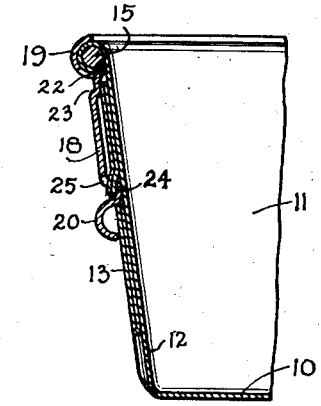
Fig. 3 is a vertical section taken on line 3—3 of Fig. 2.
Figure 4:
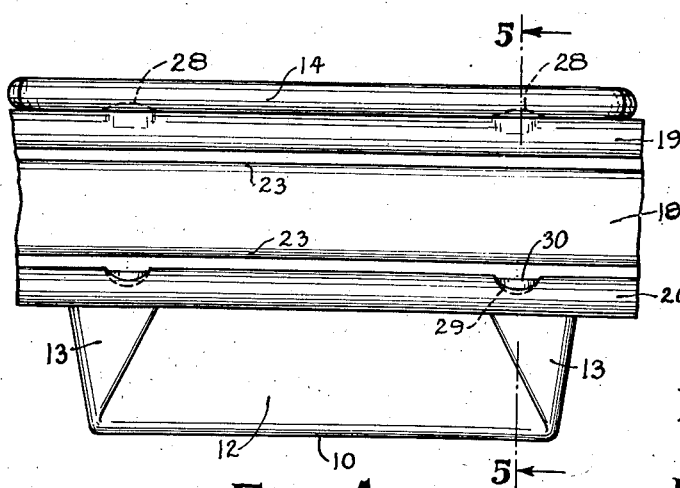
Fig. 4 is an enlarged end elevational view of an individual pan of a set illustrating a modified form of attachment of the reinforcing strap to the end wall of the pan.
Figure 5:
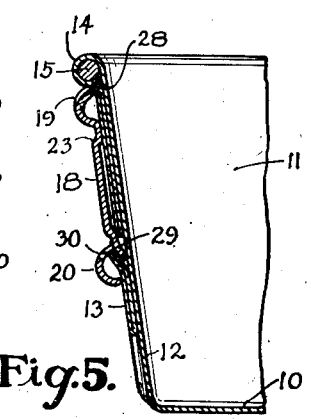
Fig. 5 is a vertical section taken on line 5—5 of Fig. 4.

Figs. 4 and 5 illustrate a slightly modified form of strap attachment. In this form, the upper edge of the strap 18 is arranged to rest against the underside of the pan bead 14 and a flattened upwardly extruded tongue 28 formed at the upper edge of the channel 19 is adapted to lie between the bead 14 and the wall of the pan. The lower portion of the strap is provided with integral tongues 29 coacting with slots 30 in the corner folds 13 thereunder to effect a connection similar to the fastening of the strap 18 by means of the tongues 24 as shown in Figs. 1, 2 and 3 except that the tongues 29 are preferably directed downwardly from the edge of the slot 30 to more effectively prevent disengagement of the tongue 28 at the top of the strap.

From the foregoing it will be observed that the straps 17 and 18 by their securement to each other and to the pan bead, and by the securement of the straps 18 to the corner folds 13 as described above, provides a connection unexposed to the interior of the pan and the extremities of the pan walls are effectively reinforced to insure a constant inside dimension at the mouth of the pan and the corner laps are maintained in intimate union with the pan walls.

It will also be seen that the outwardly offset central panel provided in the straps, together with the projection of the beads formed by the channels 19 and 20 at the edges of the straps, serve to maintain the general surface of the strap beyond the planes of the edges of the openings created by the tongues pierced from the material thereof.

What is claimed is:

1. The combination with a baking pan having an upright side wall with an outstanding bead at the upper edge of said wall, of a reinforcing strap member positioned flat against the outer surface of said pan wall and having an inwardly opening marginal channel formed along its upper edge within which the aforesaid bead is seated, and means for fastening said strap member to said wall including an inwardly and upwardly projecting tongue pierced from the channel portion of said strap member and engaged between said wall and the downwardly and outwardly extending underside surface of said bead.

2. The combination with a baking pan as claimed in claim 1 wherein an outwardly offset portion is formed in the strap member immediately below the base of said tongue.

3. The combination with a baking pan having an upright side wall with an outstanding bead at the upper edge of said wall, of a reinforcing strap member positioned flat against the outer surface of said pan wall and having an inwardly opening marginal channel formed along its upper edge within which the aforesaid bead is seated, and means for fastening said strap member to said wall including a connection between said wall and said strap member near the lower region of said strap member and an inwardly and upwardly projecting tongue pierced from the channel portion of said strap member and engaged between the pan wall and the downwardly and outwardly extending underside surface of the aforesaid bead.

4. The combination with a baking pan having an upright side wall with an outstanding bead at the upper edge of said wall, of a reinforcing strap member positioned flat against the outer surface of said upper wall and having an inwardly opening marginal channel along its upper edge, an upwardly directed tongue formed integrally with said marginal channel engaged between the pan wall and the downwardly and outwardly extending underside surface of the bead aforesaid, a tongue pierced from the portion of said reinforcing strap in downwardly spaced relation to said first named tongue having its base end substantially parallel with the longitudinal edges of said reinforcing strap, and interlocking means on said pan co-acting with said last named tongue.

5. The combination with a baking pan having an upright side wall with an outstanding bead at the upper edge of said wall, of a reinforcing strap member positioned flat against the outer surface of said pan wall and having an inwardly opening marginal channel along its upper edge, an upwardly directed tongue formed integrally with said marginal channel and engaged between the pan wall and the downwardly and outwardly extending underside surface of said bead, an inwardly opening marginal channel along the lower edge of said reinforcing strap member, a tongue pierced from a portion of said strap member having its base parallel with the longitudinal edges of said strap and disposed inwardly from the mid-region and in the vicinity of said channel at the lower edge of said strap member, and interlocking means on said pan co-acting with said lowermost tongue.

6. The combination with a baking pan as claimed in claim 5 wherein an outwardly offset portion is provided in the strap member above the base of said lowermost tongue.

7. The combination with a baking pan having an upright side wall with an outstanding bead at the upper edge of said wall, of a reinforcing strap member positioned flat against the outer surface of said wall and an upwardly directed tongue formed integrally with the strap member engaged between the pan wall and the downwardly and outwardly extending underside surface of said bead, a tongue pierced from said strap member and spaced downwardly from said tongue engaged between the pan wall and bead aforesaid, and interlocking means on said pan unexposed to the interior of said pan co-acting with said downwardmost tongue.

8. The combination with a baking pan having side and end walls, said side and end walls terminating in an outstanding bead at their upper edges and forming folds at the corners of the pan bent to rest flush against the outer surface of the end wall associated therewith, of a reinforcing strap member positioned flat against the outer surface of one of said end walls and the corner folds associated therewith having a marginal channel along its upper edge having a portion thereof formed to provide a tongue engaged between the pan wall and the downwardly and outwardly extending underside surface of said bead, a horizontal slot in each of said corner folds spaced centrally of the transverse limits of said folds, and means for fastening said reinforcing member to said wall, including a tongue pierced from a portion of said reinforcing member having its root end substantially parallel with the longitudinal edges of said strap and having its free end inserted through one of said slots and positioned between the pan wall and the innermost ply of said corner fold.

JOSEPH G. JACKSON.